United States Patent [19]

Baker

[11] Patent Number: 4,457,592
[45] Date of Patent: Jul. 3, 1984

[54] OPTICAL SYSTEM UTILIZING A TRANSVERSELY MOVABLE PLATE FOR FOCUSING

[75] Inventor: James G. Baker, Bedford, N.H.

[73] Assignee: Polaroid Corporation, Cambridge, Mass.

[21] Appl. No.: 326,850

[22] Filed: Dec. 3, 1981

[51] Int. Cl.³ .......................... G02B 9/60; G02B 13/18
[52] U.S. Cl. ...................................... 350/432; 350/465
[58] Field of Search ................. 350/432, 465; 351/169

[56] References Cited

U.S. PATENT DOCUMENTS

| | | | |
|---|---|---|---|
| 3,305,294 | 2/1967 | Alvarez | 350/432 X |
| 3,507,565 | 4/1970 | Alvarez et al. | 350/432 X |
| 3,583,790 | 6/1971 | Baker | 350/432 X |
| 3,617,116 | 11/1971 | Jones | 351/177 |
| 3,632,696 | 1/1972 | Jones | 351/177 X |
| 3,751,138 | 8/1973 | Humphrey | 350/432 X |
| 3,758,201 | 9/1973 | MacNeille | 350/432 X |
| 3,827,798 | 8/1974 | Alvarez | 350/432 |

FOREIGN PATENT DOCUMENTS 998191 7/1965 United Kingdom ................ 350/432

Primary Examiner—John K. Corbin
Assistant Examiner—Scott J. Sugarman
Attorney, Agent, or Firm—Francis J. Caufield

[57] ABSTRACT

A five element photographic objective including four elements fixed in a generally symmetric arrangement and a transversely movable refracting plate of preferred shape for maintaining the focal setting of the objective over a large range of object distances. One of the four fixed elements and the refracting plate each include at least one surface whose shape is in a nonrotational aspheric and mathematically describable by a polynomial of at least fifth order.

9 Claims, 6 Drawing Figures

OPTICAL SYSTEM UTILIZING A TRANSVERSELY MOVABLE PLATE FOR FOCUSING

BACKGROUND OF THE INVENTION

1. Field of the Invention

This invention in general relates to optical systems and, in particular, to a photographic objective system which utilizes a transversely movable member of preferred shape for maintaining the focal setting of the objective over a large range of object distances.

2. Description of the Prior Art

From the earliest use of hand cameras, it has been recognized that a change in object distance with respect to the location of the camera objective lens causes an inevitable and easily calculated change in image distance which, if not compensated in some way, leads directly to a degradation of image quality over the chosen field of view. Everyone who has made use of photographic objectives becomes aware of this fundamental fact, and indeed camera manufacturers have adopted several convenient means for bringing the aerial image and the sensitive photographic film or coated glass plate into registration.

The most natural means, one employed from the beginning, is simply the technique of moving the position of the photographic objective along the optical axis for the purpose of focusing. Generally, the film plane remains stationary. However, there are cameras and certainly telescopes with movable film or plate holders, particularly where the photographic equipment is large and cumbersome. In either case, the distance from objective to film is changed in such a way that the image can be focused onto a ground glass and thereafter onto a substituted photographic emulsion.

In some cameras, particularly in the modern era, it has proved to be convenient to restrict the focusing movement to but a portion of the optical system, generally but a single element or component. The movable element or component, however, is a mixed blessing inasmuch as the image quality may suffer as a result of the displacement of the element or component from its optimum position. Various aberrations that have been minimized or balanced for good image quality under average conditions reappear or become larger on displacement of an element or component. Both lateral and longitudinal chromatic aberrations may reappear, along with an enhancement of spherical aberration, coma, and astigmatism. However, careful design has often resulted in practicable systems with substantial range in object distances and even in magnification, as for example, the various forms of zoom systems now generally available.

Other forms of focusing have also been introduced. It is possible to interchange lens elements providing a discrete change in dioptric powers to provide a reduced focusing range for each, within which individual range the image quality can remain reasonably stable. The sequence of focusing ranges can then be made to overlap in such a way that the convertible system can be used over a large range of object distances. This technical means becomes all the easier if the focusing interchangeable elements are inherently of low dioptric power, whether positive or negative. In this way, the weak element in use at any given time interferes only slightly with the image quality and indeed may be used to improve the quality if suitably located and shaped. With moldable elements use can be made of an aspheric "touch-up" to improve the image quality selectively within the individual range. If the dioptric lens elements are mounted onto a rotor or disc for easy interchange, the rotor can be referred to as a set of Waterhouse elements. Waterhouse discs have also been used from long ago for aperture control and for insertion of readily interchangeable filters.

Still another form of focusing involves the use of liquid filled flexible cells which with changing pressure can be made to perform weak dioptric tasks such as focusing. Ordinarily, the sagittae associated with dioptric focusing of hand camera objectives are very small, whether positive or negative, and for the usual focal lengths can be measured in but a few dozens of microns. It is necessary, however, that the deformed flexible cell provide sufficiently smooth optical surfaces for acceptable image quality after focusing has been performed.

Still another form of focusing has been introduced in U.S. Pat. No. 3,305,294 issued to L. W. Alvarez on Feb. 21, 1967. In this device a pair of deformed plates are moved transversely in equal but opposite displacements. The plates have the same shapes but are opposed such that in the "null" position the variation in thickness cancels and the two plates used together have zero dioptric power. The polynomial expressions needed to define the common aspheric shape is strongly dependent on cubic terms in a power series in two variables. The polynomial coefficients are carefully chosen to allow the plates to simulate by transmission and refractions the performance of a weak dioptric lens. When the plates are moved transversely with respect to one another, the net effect is used to simulate a weak bi-convex or bi-concave simple element thereby providing for a continuous range of low dioptric powers.

It is a primary object of the present invention to provide a photographic objective system having but one transverse movable member for maintaining the focal setting of an objective system over a large range of object distances.

It is another object of the present invention to provide a photographic objective of the above type for use at relatively fast aperture ratios.

Other objects of the invention will in part be obvious and will in part appear hereinafter. Accordingly, the invention comprises the optical system possessing the construction, combination and arrangement of elements which are exemplified in the following detailed description.

SUMMARY OF THE INVENTION

This invention in general relates to optical systems and in particular to a photographic objective system which uses a transverse movable refracting member of preferred shape for maintaining the focal setting of the objective over a large range of object distances.

The objective of the invention preferably comprises five elements. Four elements are fixed in line along an optical axis and are of the form positive, negative, negative, positive. The negative third element of these four has one surface that is rotational about the optical axis and another surface which is a nonrotational aspheric.

The remaining fifth element is a refracting plate which follows the negative first element of the fixed four and moves laterally across the optical axis. The refracting plate preferably has one plano surface and another which is a nonrotational aspheric in shape, but alternatively, may have both surfaces as nonrotational aspherics. The aspheric shape of the refracting plate, in the preferred case, faces and combines with the fixed nonrotational aspheric surface of the third element, which opposes it, to provide the objective with a continuous range of dioptric power as the refracting plate moves across the optical axis over a predetermined range of distance.

The nonrotational aspheric surfaces or surface of the refracting plate and the third fixed element are mathematically described by a preselected polynomial equation of at least fifth order containing at least the following terms:

$$X = A_1 YZ^2 + A_2 YZ^4 + A_3 Y^3 + A_4 Y^3 Z^2 + A_5 Y^5$$

wherein X, Y, and Z are mutually orthogonal coordinate axes having origins at the respective vertices of the aspheric surfaces, X being the displacement from a reference plane through a surface vertex and along the optical axis, and Y and Z being perpendicular to the X-axis.

The objective further includes an aperture stop centrally located between the fixed elements. The fixed elements preferably are arranged in a generally symmetric configuration with respect to the central aperture stop to minimize certain aberrations including distortion, lateral color, coma and certain other higher order aberrations.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts and wherein:

INTRODUCTION

Figure 1:
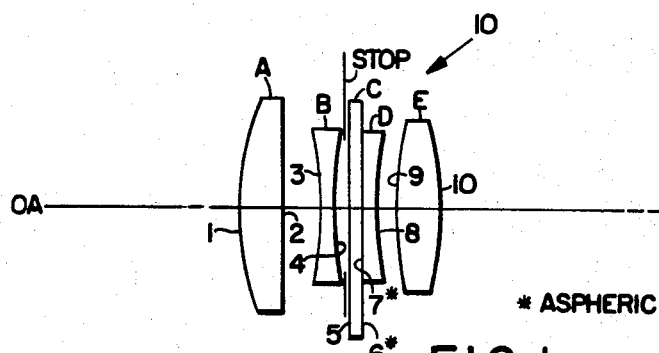
FIG. 1 is a plan view of the optical system of the invention as seen in a plane defined by mutually perpendicular X and Y axes.

The sensitivity of a given photographic lens to focusing utilizing transversely movable shaped refracting plates depends to a very large extent on the adopted aperture-ratio or f/no. of the objective. The deformed pair of plates is inherently slightly asymmetric and objectives of large aperture may have an unacceptable loss of image quality over the full field of view when the focusing plates are added even though the image from the undisturbed objective might well be free of significant aberrations in various positions in the field. The pair of plates causes small unsymmetrical prismatic refractions which, however carefully controlled, may in fact lead to image degradation that must be kept within reasonable bounds. The easiest way to compromise between focusing and image quality has been to reduce the lens speed or aperture-ratio. With the very fast photographic emulsions now commonly available, quite slow lens systems have been possible. Aperture ratios of the order of f/11 to f/16 are quite common. In this manner, not only is focusing itself by means of the pair of shaped plates readily obtained but the depth of focus associated with reduced apertures also becomes available.

However, if faster apertures are required, it is evident that best results can be obtained if the optical system is designed as a whole. That is to say, one does not just design a photographic objective and then insert shaped plates into the system, but instead must adapt the form of design to the use of the shaped plates. In general, it is desirable for manufacturing purposes to have the shaped plates more or less plane-parallel and indeed the outlying surfaces may be precisely plano to retain simplicity of form and smoothness of at least two surfaces of the pair of plates. In addition, the shaped plates in near contact with one another ought to lie quite near to the iris or real stop of the system and therefore near to the shutter, if a between-the-lens form is used. If the shaped plates are indeed near the real stop, the excursions of rays in prismatic refractions through the plates can be minimized and the image quality thereby preserved at the same time that variable transverse motion is used to perform focusing.

My invention combines several novel features into a compatible objective. I have found that it is possible to simulate the pair of transverse sliding plates in a somewhat rough form by moving but one member of the pair and by having the second member of the pair fixed in position. In this way, the second or outlying surface of the fixed plate can be given substantial dioptric curvature, if required by the design, whether positive or negative, and the use of an additional lens element is thereby avoided. The movable member, however, either must have its second or outlying face plano in order for its movement to retain a plano refraction with the plano surface accurately perpendicular to the optical axis during the movement or else the outlying face must share in nonrotational action.

The movement of but one member of the pair for a given aspheric depth of the nearly identical aspheric shapes on the two adjacent surfaces will require substantially twice the transverse travel, as compared to the earlier cases (for example shown in my previous U.S. Pat. No. 3,583,790) where the pair of plates move equally and in opposite transverse directions. On the other hand, the doubled transverse motion offers no essential added difficulty in view of the fact that the aspheric depth of the plate can be chosen in offset anyway to the amount of transverse motion desired. It should also be noted that strongly deformed plate moves transversely only slightly for a given dioptric action, whereas a weak aspheric plate may have to move transversely much farther.

DESCRIPTION OF THE PREFERRED EMBODIMENT

With the above principles in mind, I have chosen a preferred shape that allows for a reasonable transverse plate motion compatible with the size of the objective which is shown in its preferred embodiment in FIG. 1 at 10.

It can be observed in FIG. 1 that the objective lens 10 is a form derived most closely from the four element symmetrical arrangement used in various ways for good photography for a number of decades. The sequence of elements is A (positive), B (negative), C (transversely movable plano-nonrotational aspheric plate), D (negative, nonrotational aspheric-spherical), and then E (positive). Elements A, B, D and E are fixed in line along the optical axis, OA. By way of example, the objective lens 10 has constructional data substantially in conformance with the following table:

TABLE
(Refer to FIG. 1)

| Element | Surface | Radius | Separation Medium | Air | $N_d$ | $V_d$ |
|---------|---------|--------|-------------------|-----|-------|-------|
| A | 1 | 0.3663 | 0.0650 | | 1.678 | 55.2 |
| | 2 | 30.77 | | 0.0522 | | |
| B | 3 | −0.6963 | 0.0200 | | 1.596 | 39.2 |
| | 4 | 0.5257 | | 0.0240 | | |
| C | 5 | plano | 0.0180 | | 1.592 | 30.8 |
| | 6 | plano* | | 0.0020 | | |
| D | 7 | 4.085* | 0.0180 | | 1.592 | 30.8 |
| | 8 | 0.4439 | | 0.0356 | | |
| E | 9 | 0.7821 | 0.0600 | | 1.670 | 47.1 |
| | 10 | −0.4856 | | | | |

*nonrotational aspheric wherein the surfaces of the elements are numbered in the order in which light is encountered in traveling from object to image space, $N_d$ is the index of refraction, $V_d$ is the Abbe number, the radii and separations are normalized with respect to a predetermined focal length, $f_o = 113.86$ mm, of the objective, surfaces 6 and 7 include an aspheric surface replacing their base radii given in the above table of constructional data, surfaces 5 and 6 define element C which is adapted to move transverse to the optical axis, OA, of the objective 10, and wherein the nonrotational aspheric surfaces are given by a polynomial equation of the form:

$$X = A_1YZ^2 + A_2YZ^4 + A_3Y^3 + A_4Y^3Z^2 + A_5Y^5$$

wherein the coefficients thereof, normalized to $f_o$, are:

$A_1 = 1.4125$
$A_2 = -0.2176$
$A_3 = 0.4766$
$A_4 = 0.1210$
$A_5 = -0.3849$

The transverse sliding element C, comprised of surfaces 5 and 6, combines with the opposed fixed aspheric polynomial surface on surface 7 to simulate the dioptric radius given here as 4.085, the vertex radius of surface 7, corresponding to an object distance of 0.84 meters. Similarly, when the radius of surface 7 is infinite (plano surface), for the mean object distance of 2.32 meters, the corresponding $f_d$ is substantially equivalent to the adopted unit length of 114.0 mm of the table.

The aspheric surface of element C combines with aspheric surface 7 of element D to provide the objective 10 with a continuous range of dioptric power as element C moves across the optical axis, OA, over a predetermined distance range.

The relative aperture over which the objective 10 gives acceptable performance for photographic work is 3.8 or in conventional terms f/3.8 and the range of object distances for which adequate focus control can be obtained extends from infinity to approximately 0.6 meters with a transverse plate motion of approximately 16.84 mm.

Figure 2:
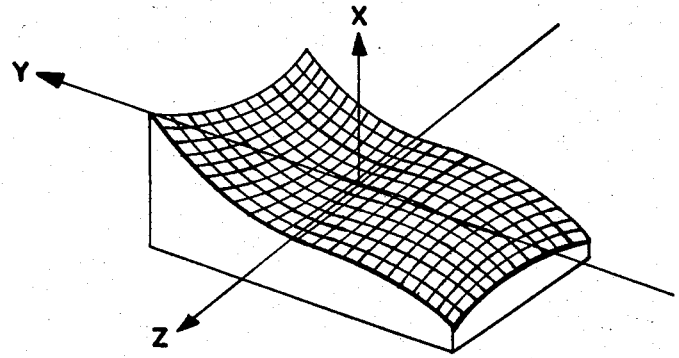
FIG. 2 is an enlarged diagrammatic perspective of one of the elements of the system of FIG. 1 oriented in a mutually perpendicular X, Y, Z coordinate system.
Figure 5:
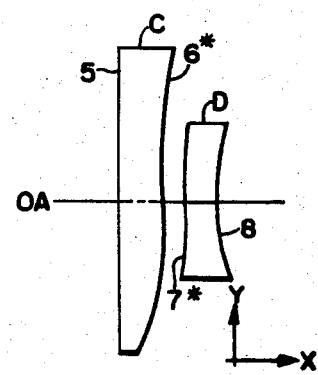
FIG. 5 is an enlarged diagrammatic plan view of selected elements of the system of FIG. 1.
Figure 3:
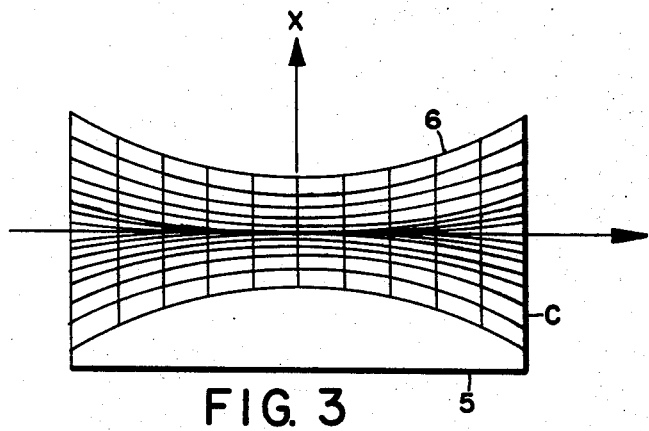
FIG. 3 is a view of the element of FIG. 2 as seen looking along the Z-axis projection onto the X-Z plane.
Figure 4:
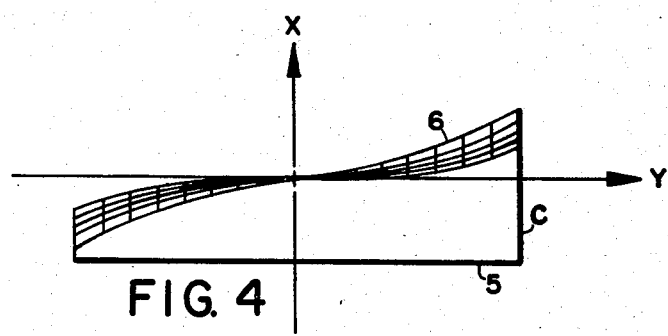
FIG. 4 is a view of the element of FIG. 2 as seen looking along the Y-axis in projection onto the X-Y plane.

The transversely movable element C is shown in diagrammatic fashion in FIGS. 2, 3 and 4 to illustrate the shape of its nonrotational aspheric surface 6. It is to be noted that the shape of surface 7 of fixed element D is similar to that of surface 6 but, of course, is opposed as shown in FIG. 5 to effect the necessary dioptric changes.

The movable element C is not necessarily symmetrical in length above and below the optical axis, OA. This circumstance arises from the fact that the mean focal length setting can be purposely biased to favor a reduced focusing motion on the side of the mean favoring infinity focus and good performance at infinity focus. On the short conjugate side of the mean, it is generally desirable to allow for focusing quite nearby even at the sacrifice of image quality, but here the objects being photographed are generally not in need of critical image quality inasmuch as their images are large because of their nearness. As shown in FIG. 1, the movable plate, element C, is larger below the optical axis, OA, to allow for being moved upwards through the necessary transverse distance to fill the aperture at the nearest focal setting.

There exists a wide variety of other lens forms that might be used, including but not limited to triplets, Tessars and more elaborate systems. However, since it is desirable to minimize the maximum slope angles of the extreme rays passing through the deformed surfaces the present form is preferable. Regardless of the basic form used, however, one must minimize the prismatic refractions by having all rays stay as near to minimum deviation through the deformed surfaces as reasonably possible. For the same reason, it is important that the air space between the aspheric shapes be as small as possible to prevent unnecessary transverse excursions of the many rays over aperture, spectrum and field.

In addition, a fully symmetrical objective of the form shown can be designed, but in general the task of focusing a distant object plane onto a nearby image plane is inherently not symmetrical in the conjugates. Therefore, even though chief ray refractions are treated favorably in the fully symmetrical form with respect to distortion and lateral color, as well as to coma and certain higher order aberrations, in practice a fully optimized lens form departs significantly from full symmetry between front and rear halves of the system.

Figure 6:
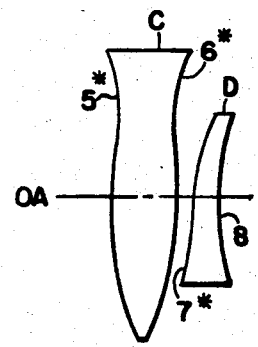
FIG. 6 is an enlarged diagrammatic plan view of alternate forms of the elements of FIG. 5.

It is also not absolutely necessary for surface 5 of the movable refracting plate (element C) to be exactly plano. Instead, the action of the nonrotational aspheric surface 6 may be split using two weaker nonrotational aspherics on either side of element C as shown in FIG. 6. In this case, the surfaces may be identical or nearly so or may be different. In the case where the two surfaces are identical, their polynomial coefficients are equal in value but oposite in sign but, where they are different, their polynomial coefficients will differ in value and sign. When the nonrotational aspheric action of the refracting plate is shared by its surfaces, whether different or the same, the nonrotational aspheric shape of surface 7 in fixed element D will also take on a new shape compared with the example given above.

An example of a case with both sides of the refracting plate C having identical nonrotational aspherics and surface 7 of element D undergoing its required change in shape is given below where the aspheric coefficients of the previous example change to the stated values below with all other constructional data remaining identical to the previous example. However, for this example the transverse movement of the refracting plate over the focusing range from infinity to 0.6 meters is 34.26 mm or roughly twice that for the previous example. This is explained by the fact that the nonrotational aspherics are weaker compared to the single aspheric of the previous example. This suggests that for these types of systems there is discretion for choosing the range of translation amplitude for the moving plate.

| Surface | 5 | 6 | 7 |
|---|---|---|---|
| A1 | −0.3570 | 0.3570 | 0.7140 |
| A2 | 0.1859 | −0.1859 | −0.3719 |
| A3 | −0.1221 | 0.1221 | 0.2443 |
| A4 | 0.0016 | −0.0016 | −0.0032 |
| A5 | 0.0862 | −0.0862 | −0.1723 |

As shown by the examples, a reasonably compact four element form has been devised with a movable nearly plane parallel transverse movable plate added as an interpolated fifth element. An iris and shutter can occupy what remains of the central air space. The task of design is to choose optical materials, radii, thicknesses and separations to achieve a balanced result over the adopted focusing range. It is important to note that the use of transverse focusing aspheric shapes requires somewhat different aspheric coefficients if, as here, but one plate is moved as compared to two. In either case the coefficients are chosen to simulate the presence of a "centered" dioptric lens, much like those of the discrete series in a Waterhouse arrangement, except that the sliding action of the plates allows for continuity of focusing. Fortunately, the modern computer can be used to carry out the necessary calculations for optimum simulation of centered dioptric powers without undue difficulties caused by the extensive asymmetries present. Fourth and sixth power terms can also be used in the polynomial equation to reduce residual asymmetries.

Certain changes may be made in the above-described embodiment without departing from the scope of the invention and those skilled in the optical arts may make still other changes according to the teachings of the disclosure. For example, the size of the optical system described may be scaled up or down in a well-known manner so long as the changes in optical performance which attend such scale changes do not exceed the allowable limits for the particular photographic application. Therefore, it is intended that all matter contained in the above description or shown in the accompanying drawings shall be interpreted as illustrative and not in a limiting sense.

What is claimed is:

1. A five element, variable focus, photographic objective comprising:
four fixed elements of form positive, negative, negative, positive positioned in line along an optical axis, said first positive and negative fixed elements being structured to in combination be collimating, and said second negative and positive fixed elements being structured to in combination be convergent, said second negative element having one surface of predetermined rotational shape and another surface which is a nonrotational asphere in shape; and a refracting plate following said first fixed negative element of said objective and movable laterally across said optical axis, said refracting plate having at least one surface which is a nonrotational asphere in shape and faces said aspheric surface of said second negative fixed element, said aspheric surface of said refracting plate being operative to in combination with said opposed fixed aspheric surface of said second fixed negative element to provide said objective with a continuous range of dioptric power as said refracting plate moves across said optical axis over a predetermined range of distance.

2. The photographic objective of claim 1 wherein said aspheric surfaces of said refracting plate and said third fixed negative element are mathematically described by a preselected polynomial equation of at least fifth order.

3. The photographic objective of claim 2 wherein said polynomial equation contains at least the following terms:

$$X = A_1 YZ^2 + A_2 YZ^4 + A_3 Y^3 + A_4 Y^3 Z^2 + A_5 Y^5$$

wherein X, Y, and Z are mutually orthogonal coordinate axes having origins at the respective vertices of said aspheric surfaces, X being the depth from a reference plane through a vertex and along said optical axis, and Y and Z being perpendicular to said X-axis.

4. The objective of claims 1 or 2 further comprising an aperture stop centrally located between said second and third negative elements and wherein said fixed elements of said objective are generally symmetrically arranged with respect to said central aperture stop to minimize certain aberrations including distortion, lateral color, coma and certain other higher order aberrations.

5. A multi-element, variable focus photographic objective comprising:
a forward group of refracting elements fixed in line along an optical axis and configured and arranged with respect to one another so that light emerges from the last of said elements collimated or nearly collimated;

a rearward group of refracting elements fixed along said optical axis; and a pair of refracting plates located between said forward and rearward groups in the path of collimated bundles of rays emergent from said forward group and including a fixed plate and a plate transversely moveable across said optical axis, said fixed plate having one surface of predetermined rotational shape and another surface which is a nonrotational asphere in shape, said fixed plate rotational surface and said second group of elements being configured and arranged with respect to one another to be optically convergent, said moveable plate having at least one surface which is a nonrotational asphere in shape and faces said aspheric surface of said fixed plate, said aspheric surface of said moveable plate and said opposed aspheric surface of said fixed plate being structured to cooperate with one another to provide said objective with a continuous range of dioptric power in correspondence with the movement of said moveable plate across said optical axis over a predetermined range of distance.

6. The photographic objective of claim 5 wherein said aspheric surfaces of said refracting plates are mathematically described by a preselected polynomial equation of at least fifth order.

7. The photographic objective of claim 6 wherein said polynomial equation contains at least the following terms:

$$X = A_1 YZ^2 + A_2 YZ^4 + A_3 Y^3 + A_4 Y^3 Z^2 + A_5 Y^5$$

wherein X, Y, and Z are mutually orthogonal coordinate axes having origins at the respective vertices of said aspheric surfaces, X being the depth from a reference plane through a vertex and along said optical axis, and Y and Z being perpendicular to said X-axis.

8. A multi-element, variable focus photographic objective having constructional data substantially in conformance with the following table:

| Surface | Radius | Separation Medium | Air | $N_d$ | $V_d$ |
|---|---|---|---|---|---|
| 1 | 0.3663 | 0.0650 | | 1.678 | 55.2 |
| 2 | 30.77 | | 0.0522 | | |
| 3 | −0.6963 | 0.0200 | | 1.596 | 39.2 |
| 4 | 0.5257 | | 0.0240 | | |
| 5 | plano | 0.0180 | | 1.592 | 30.8 |
| 6 | plano* | | 0.0020 | | |
| 7 | 4.085* | 0.0180 | | 1.592 | 30.8 |
| 8 | 0.4439 | | 0.0356 | | |
| 9 | 0.7821 | 0.0600 | | 1.670 | 47.1 |
| 10 | −0.4856 | | | | |

*nonrotational aspheric wherein the surfaces of said elements are numbered in the order in which light is encountered in traveling from object to image space, $N_d$ is the index of refraction, $V_d$ is the Abbe number, said radii and separations are normalized with respect to a predetermined focal length, $f_o = 113.86$ mm, of said objective, surfaces 6 and 7 include a nonrotational aspheric surface replacing their base radii given in the above table of constructional data, surfaces 5 and 6 define an element of said objective which is adapted to move transverse to the optic axis of said objective and, in combination with the opposed fixed nonrotational aspheric surface of surface 7, provide said objective with a continuous range of dioptic power as said element moves across said objective optic axis, said radius of 4.085 for surface 7 given in the above constructional data being the dioptric equivalent vertex radius of surface 7 normalized by said predetermined focal length, $f_o$, and wherein said aspheric surfaces are given by a polynomial equation of the form:

$$X = A_1 YZ^2 + A_2 YZ^4 + A_3 Y^3 + A_4 Y^3 Z^2 + A_5 Y^5$$

wherein the coefficients thereof, normalized to $f_o$, are:
$A_1 = 1.4125$
$A_2 = -0.2176$
$A_3 = 0.4766$
$A_4 = 0.1210$
$A_5 = -0.3849$ 9. A multi-element, variable focus photographic objective having constructional data substantially in conformance with the following table:

| Surface | Radius | Separation Medium | Air | $N_d$ | $V_d$ |
|---|---|---|---|---|---|
| 1 | 0.3663 | 0.0650 | | 1.678 | 55.2 |
| 2 | 30.77 | | 0.0522 | | |
| 3 | −0.6963 | 0.0200 | | 1.596 | 39.2 |
| 4 | 0.5257 | | 0.0240 | | |
| 5 | plano | 0.0180 | | 1.592 | 30.8 |
| 6 | plano* | | 0.0020 | | |
| 7 | 4.085* | 0.0180 | | 1.592 | 30.8 |
| 8 | 0.4439 | | 0.0356 | | |
| 9 | 0.7821 | 0.0600 | | 1.670 | 47.1 |
| 10 | −0.4856 | | | | |

*nonrotational aspheric wherein the surfaces of said elements are numbered in the order in which light is encountered in traveling from object to image space, $N_d$ is the index of refraction, $V_d$ is the Abbe number, said radii and separations are normalized with respect to a predetermined focal length, $f_o = 113.86$ mm, of said objective, surfaces 5, 6 and 7 include a nonrotational aspheric surface replacing their base radii given in the above table of constructional data, surfaces 5 and 6 define an element of said objective which is adapted to move transverse to the optic axis of said objective and, in combination with the opposed fixed nonrotational aspheric surface of surface 7, provide said objective with a continuous range of dioptic power as said element moves across said objective optic axis, said radius of 4.503 for surface 7 given in the above constructional data being the dioptic equivalent vertex radius of surface 7 normalized by said predetermined focal length, $f_o$, and wherein said aspheric surfaces are given by a polynomial equation of the form:

$$X = A_1 YZ^2 + A_2 YZ^4 + A_3 Y^3 + A_4 Y^3 Z^2 + A_5 Y^5$$

wherein the coefficients thereof, normalized to $f_o$, are:

| Surface | 5 | 6 | 7 |
|---|---|---|---|
| $A_1$ | −0.3570 | 0.3570 | 0.7140 |
| $A_2$ | 0.1859 | −0.1859 | −0.3719 |
| $A_3$ | −0.1221 | 0.1221 | 0.2443 |
| $A_4$ | 0.0016 | −0.0016 | −0.0032 |
| $A_5$ | 0.0862 | −0.0862 | −0.1723 |

* * * * *